Patented Oct. 20, 1925.

1,557,758

UNITED STATES PATENT OFFICE.

HARRY R. FULTON AND JOHN J. BOWMAN, OF WASHINGTON, DISTRICT OF COLUMBIA, DEDICATED, BY MESNE ASSIGNMENTS, TO THE PEOPLE OF THE UNITED STATES.

PROCESS FOR PREVENTION OF DECAY IN FRUITS AND VEGETABLES.

No Drawing. Original application filed July 9, 1925, Serial No. 42,552. Divided and this application filed September 11, 1925. Serial No. 55,862.

(GRANTED UNDER THE ACT OF MARCH 3, 1883; 22 STAT. L. 625.)

*To all whom it may concern:*

Be it known that we, HARRY R. FULTON and JOHN J. BOWMAN, citizens of the United States of America, and employees of the United States Department of Agriculture, residing at Washington, District of Columbia, whose post-office address is % Department of Agriculture, Washington, District of Columbia, have invented a new and useful Process for the Prevention of Decay in Fruits and Vegetables, of which the following is a specification.

This application is a divisional application of the application for a patent by the same parties, which bears Serial Number 42,552 and filing date July 9, 1925, entitled Process for the prevention of decay in fruits and vegetables.

This application is made under the act of March 3, 1883, chapter 143 (22 Stat. 625) and the invention herein described and claimed may be used by the Government of the United States, and its officers and employees, and by any person in the United States without the payment to us of any royalty thereon. We hereby dedicate the same to the free use of the Government and the people of the United States.

The object of this invention is to prevent the development of decay in citrus and other fruits and vegetables during the process of marketing, especially the prevention of the forms of decay of citrus fruits known as stem-end rot and blue-mold rot.

Stem-end rot of citrus fruits is caused by either of two fungi, known as *Phomopsis citri* and *Diplodia natalensis*. The fruit apparently becomes contaminated or incipiently infected with these fungi while still on the trees, but actual decay does not set in until some days or weeks after the fruit has been removed from the trees in the process of marketing. Up to the present time measures for these two stem-end rots have included one or more of the following procedures: (1) Keeping down sources of infection in the orchards by pruning out dead wood that harbors the two causal fungi; (2) spraying the young fruit with a suitable fungicide, such as Bordeaux mixture, so as to protect it against infection; (3) exposing the fruit after picking to certain gases, such as ethylene gas, or the fumes from imperfect combustion of gasolene or kerosene, under conditions of high humidity and temperature, in such way as to cause a loosening and shedding of the small portion of stem, with the calyx and receptacle, commonly called the "button", which is usually left attached to the fruit proper in the ordinary methods of clipping the citrus fruit from the trees. Most of the stem-end rot infection seems to enter the fruit through, or in the immediate vicinity of this button, and its removal effectively prevents stem-end rot; (4) refrigerating, precooling, or otherwise keeping the temperature of the fruit low enough to retard and so prevent the development of stem-end rot during a reasonable marketing period.

Blue-mold rot of citrus fruits is commonly caused by either of two fungi, known as *Penicillium digitatum* and *Penicillium italicum*. The methods now in general use for the control of blue-mold rot comprises the following: (1) Careful handling of the fruit during the picking, packing, and market handling so as to avoid any wounds or breaks in the skin of the fruit through which the blue-mold rot fungus might gain entrance and set up infection; (2) keeping the surface of the fruit as dry as possible so as not to have continuous moist conditions long enough for the blue-mold spores to germinate and set up infection; (3) refrigerating, precooling, of otherwise keeping the temperature of the fruit low enough to retard and so prevent the development of blue-mold rot during a reasonable marketing period.

The present invention controls or reduces liability to loss from stem-end rot by applying to the fruit and leaving upon its surface a sufficient residue of certain chemicals that have an inhibiting or destroying effect on the fungi causing stem-end rot, as well as upon other fungi causing decay of citrus and other fruits, as well as other perishable vegetable products, such as blue-mold rot, anthracnose rot, blossom-end rot. These chemicals are especially suitable for the practical control of various decays because of (1) their antiseptic or inhibitory action on the fungi causing the rots; (2) their ability to go into solution in any surface moisture sufficient for causing germination of spores of any of these rot organisms; (3) their ability to wet the surface, and adhere thereto and penetrate to some extent into the tissues of the fruits; (4) their non-injurious effect on the fruit itself; (5) their non-toxic properties for persons consuming the fruit.

The chemicals that we have found to be effective and useful for this purpose are lithium salts of strong acids, (a strong acid being one that possesses high power of ionization, such as sulphuric acid, hydrochloric acid, nitric acid, and hydrobromic acid), examples of such effective salts being lithium sulphate, lithium nitrate, lithium bromide, and lithium chloride.

The method of treatment consists essentially in applying a solution of effective strength of any one of the chemicals in question, or a combination of them, to the fruit during the process of packing the fruit for marketing, and allowing a sufficient residue to remain on the surface of the fruit. The application may be made by means of a spraying device that will wet the fruit thoroughly with the solution after it has been washed in the usual way, or without being washed, and before it passes into the drying unit, the surplus spray drip being caught in a suitable tank or pan under the conveyor, and recirculated by means of a pump, or the fruit may be caused to dip in or be carried through a vat or tank in which the solution of effective strength is contained, the duration of the passage through such tank being sufficiently long to give effective results, usually from a fraction of a minute up to four or five minutes. Solutions of the chemicals named are effective at temperatures at which water is ordinarily used in citrus packing houses, namely from about 65° F. to about 85° F. and remain effective at higher temperatures up to the maximum that is safe for citrus fruit, namely to about 120° F., and there is a gradual increase in effectiveness with increasing temperature. It is therefore advantageous to apply these solutions warm, at temperatures up to about 120° F., and in such case it would be advantageous to give rather long exposures, of about five minutes, in tanks specially equipped with steam pipes, hot water pipes, electric immersion heaters, or pipes for circulating the chemical solution itself through coils in a suitable heater, or by other means for supplying and maintaining an adequate supply of heat. Any of the solutions may also be applied to the fruit as it passes over the scrubbing brushes in the various types of washers in ordinary use, by simply keeping such brushes wet with the solution.

The strength of solution for effective results also varies within rather wide limits for each chemical depending somewhat on the conditions of infection encountered by the fruit subsequent to treatment. Under less severe conditions of infection a weaker strength might prove as effective as would a greater strength of solution under more severe conditions of infection. In general, it may be stated that these chemicals are effective in aqueous solutions ranging in strength between $3/4\%$ and $5\%$ by weight, but in some cases and under some conditions an effective strength may be less than $3/4\%$, or strengths greater than $5\%$ may be used without detriment to the fruit. However, tests made in the development of this invention have shown each of the specified chemicals to be effective at some strength within the range indicated.

The specific advance over other methods previously used consists in leaving on fresh fruit or vegetables as prepared for market a surface residue of the above mentioned inhibiting chemicals that will effectively check the development of rot fungi over an extended marketing period.

We claim:

1. A process for preserving fresh fruits and vegetables for market which comprises the application to the surface of such articles of a solution of a salt of lithium in which the lithium base is combined with a strong acid radical, to retard the growth or development of the organisms causing stem-end rot, blue-mold rot, and other forms of decay.

2. A method for the prevention of decay of fruits and vegetables consisting in the treatment of such articles with a solution comprising a halide salt of lithium.

3. A method for the prevention of decay of fruits and vegetables consisting in the treatment of such articles with a solution comprising lithium chloride.

HARRY R. FULTON.
JOHN J. BOWMAN.